US008464325B2

(12) United States Patent
Purdy, Sr. et al.

(10) Patent No.: US 8,464,325 B2
(45) Date of Patent: Jun. 11, 2013

(54) METHOD AND SYSTEM FOR VERIFYING ENTITLEMENT TO ACCESS CONTENT BY URL VALIDATION

(75) Inventors: Gregor N. Purdy, Sr., Sunnyvale, CA (US); Tony F. Kinnis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 646 days.

(21) Appl. No.: 12/359,909

(22) Filed: Jan. 26, 2009

(65) Prior Publication Data
US 2010/0192210 A1    Jul. 29, 2010

(51) Int. Cl.
*G06F 7/04* (2006.01)
*H04L 29/06* (2006.01)

(52) U.S. Cl.
USPC .............................................. 726/7; 713/160

(58) Field of Classification Search
USPC .................. 726/7, 30, 31; 713/160; 707/607, 707/787; 725/112
See application file for complete search history.

(56) References Cited

U.S. PATENT DOCUMENTS

| 6,574,609 | B1 * | 6/2003 | Downs et al. ................... | 705/50 |
| 7,310,729 | B2 | 12/2007 | Gordon et al. | |
| 2002/0111907 | A1 * | 8/2002 | Ling ............................... | 705/41 |
| 2003/0037070 | A1 * | 2/2003 | Marston ......................... | 707/200 |
| 2005/0060266 | A1 * | 3/2005 | DeMello et al. ................ | 705/57 |
| 2006/0005258 | A1 * | 1/2006 | Hirose ............................ | 726/27 |
| 2007/0162611 | A1 * | 7/2007 | Yu et al. ......................... | 709/232 |
| 2007/0203841 | A1 | 8/2007 | Maes | |

FOREIGN PATENT DOCUMENTS
WO    WO2008060299 A1    5/2008

* cited by examiner

*Primary Examiner* — Nathan Flynn
*Assistant Examiner* — Abdullah Almamun
(74) *Attorney, Agent, or Firm* — Novak Druce Connolly Bove + Quigg LLP

(57) ABSTRACT

Aspects include a mechanism of entitling users to transacted-for digital content access, indicating download authorization with discrete authentication URLs, and validating download attempts using each such URL. The authentication mechanism comprises producing an encrypted string included in a URL provided to a user. The encrypted string comprises transaction identifier information, and information about the transacted-for entitlement. When a user wishes to exercise the transacted-for entitlement, the user activates the URL, which is resolved to a location that has/can obtain access to the key(s) used in producing the encrypted string, decrypt the string, and use the information in it to validate the URL and the entitlement. The validation can use data retrieved from a database, using the transaction identifier as a key. The entitlement information included in the now-decrypted string can be compared with the prior download information. A byte range of requested by a browser using the URL can be used in validation, as well as how a particular authorization/validation should count for entitlement fulfillment.

22 Claims, 4 Drawing Sheets

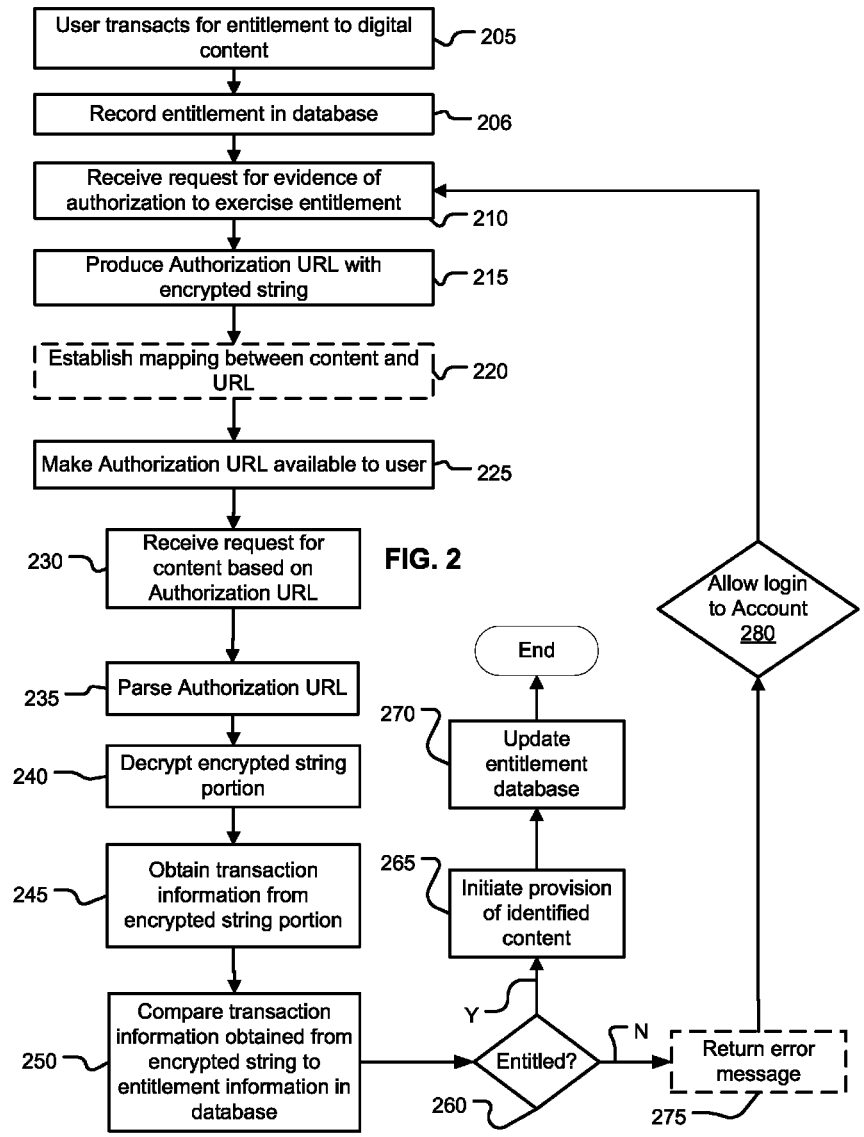

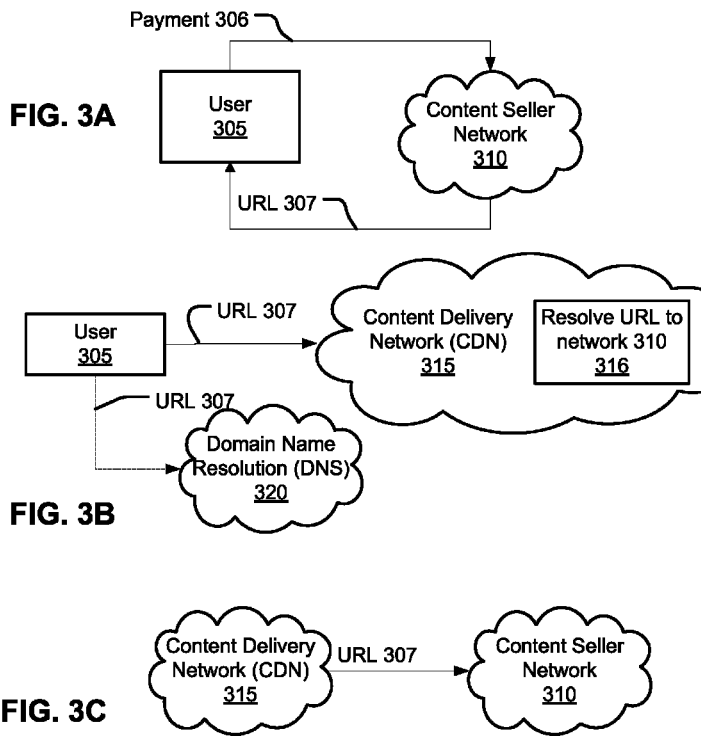
FIG. 3A
FIG. 3B
FIG. 3C
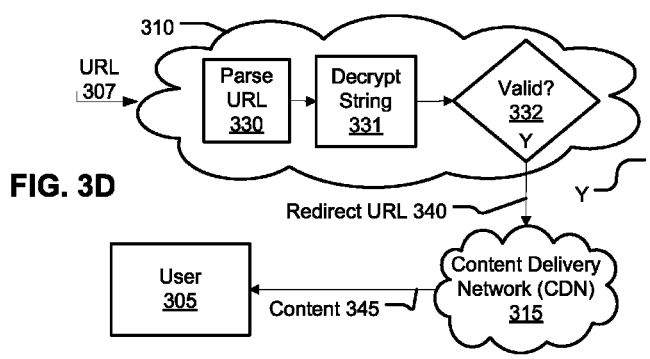
FIG. 3D

METHOD AND SYSTEM FOR VERIFYING ENTITLEMENT TO ACCESS CONTENT BY URL VALIDATION

FIELD

The following generally relates to methods and systems for providing controlled access to digital content over electronic networks.

RELATED ART

As evident from the wide-spread usage of peer to peer networks for sharing copyrighted material, which is otherwise available for lawful purchase, owners of such copyrighted material generally desire a means for controlling access to digital content. A variety of mechanisms for effecting such control exist, and can be described generically as Digital Rights Management (DRM) technology. Such technology can include, for example, encrypting a work so that it is only readable by a secret key associated with a particular user.

Although helpful in reducing piracy of digital content, such measures can inhibit the usability of the content by lawful purchasers of it. Therefore, there has been pushback to the widespread usage of strong DRM technology, especially for material that was lawfully purchased. Nevertheless, some access controls can be desirable to help control abusive sharing of content that is distributed without a strong form of encryption protecting it. Such controls preferably provide ease of use for lawful content.

SUMMARY

One aspect comprises a method for controlling access to unsecured digital content available made available over electronic networks. The method comprises transacting with a user in a transaction system for purchase of rights to digital content to be delivered over an electronic network, and entitling the user to exercise the purchased rights to the digital content by storing a record of the transaction in a computer readable medium in operative communication with the transaction system. The method also comprises creating an authorization URL to be used by the user for accessing the digital content, the authorization URL comprises an encrypted string. The encrypted string represents, upon decryption, unique transaction identifier information and rights information representative of the rights to which the user is entitled. Access to the authorization URL is provided to a user device.

Subsequently, a request to exercise the purchased rights, indicated by access to the authorization URL from the user device, is accepted. The authorization URL is parsed to obtain the encrypted string, which is decrypted. The method comprises validating the requested exercise of rights using the rights information from the encrypted string, and responsive to successful validation, providing access to the digital content identified by the URL.

Entitlements can specify constraints on access, such as constraining a number of distinct accesses permitted or a time limit, or time frame during which access is permitted, and so on. A variety of information can be included in the encrypted portion, including such access constraint information. A number of valid authorization URLs, each with a different encrypted portion, can be generated for the same entitlement. Each such authorization URL preferably includes a time stamp, which is used to validate whether that URL has been activated within a prescribed time limit.

Other aspects and embodiments include systems and computer readable media that can comprise data structures representative of data and computer readable instructions.

BRIEF DESCRIPTION OF THE DRAWINGS

FIG. 2 depicts steps of an example method that can be implemented in the arrangement depicted in FIG. 1; and FIGS. 3A-3D illustrate communication among devices in the arrangement of FIG. 1 during an example content purchase and download authorization sequence;

DETAILED DESCRIPTION

The following describes examples, embodiments and aspects relating to systems and methods for providing access to digital content over an electronic network, where entitlement to download content is controlled. These disclosures can be applied in a variety of contexts and can be adapted for use in different situations, and therefore, the following description is not limiting, and provides a basis for persons of ordinary skill to extend and apply these disclosures in appropriate applications. One particular application of the following disclosures is in a large scale enterprise for sale and distribution of content, wherein many users may each be attempting to purchase the same item of content from a vast number of titles, such that it is desired to make the content items readily accessible, while still not publicly accessible. Also, the following aspects provide a three-part process and mechanisms for implementing the process. The process decouples an entitlement-creating transaction from the evidence of authorization to exercise the entitlement obtained in the transaction, and validation of the exercise of such rights.

Figure 1:
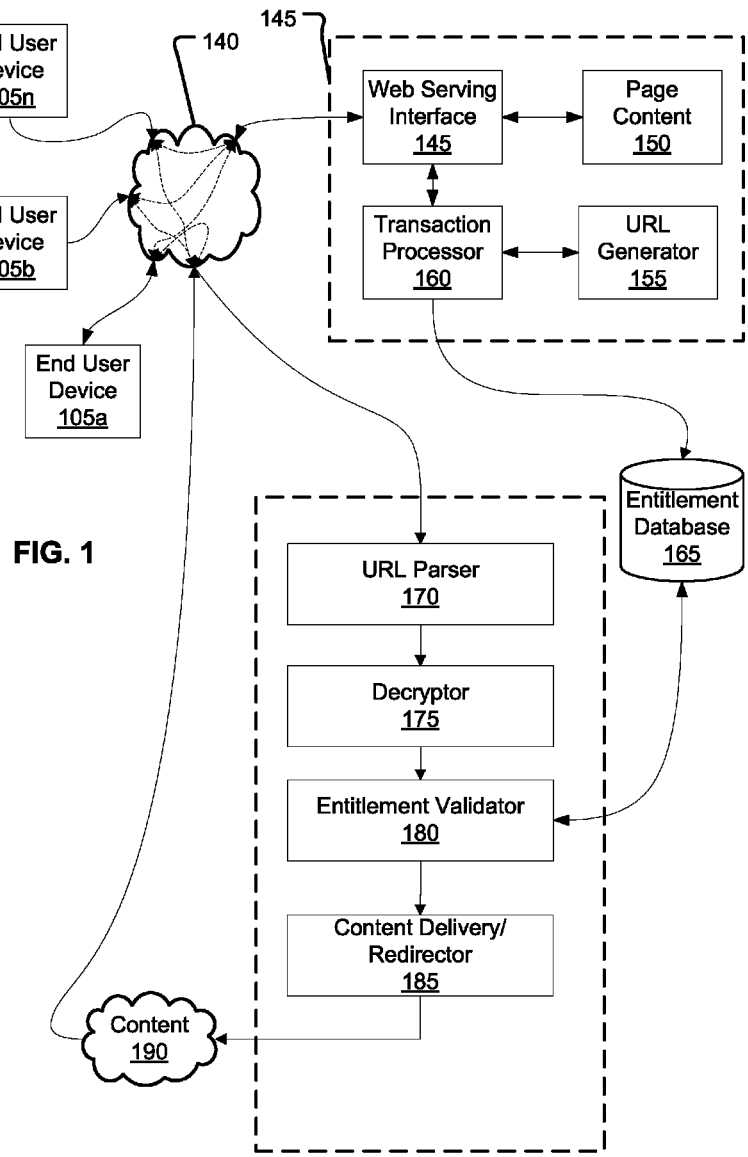
FIG. 1 depicts an example arrangement of user devices, a transaction system configured for transacting with users for rights to digital content, mechanisms for authorizing delivery of that content, and for delivering that content responsive to authorization.

FIG. 1 illustrates a first situation where a plurality of end user devices 105a-105n can communicate through an electronic network 140 with servers controlled by an entity capable of conducting transactions for delivery of such content. The servers communicating with them can include a web serving interface 145 that can obtain content from a content repository 150. Such content can include images, scripts, samples of various media, and so on. Web interface 145 can communicate with a transaction processor 160 that handles the transaction with the user for purchase of rights to access certain content. For example, the transaction processor 160 can include software running on hardware that operates to allow a selection of an item for purchase, which can mean in this context that the user purchases an entitlement to download that item a defined or a preset number of times, for example.

Transaction processor 160 is also configured to request a URL from a URL generator 155. Transaction processor 160 provides information concerning the transaction to URL generator 155. The information includes transaction identifier information that can be used as a key in a transaction database lookup. The information also preferably includes a unique identifier for the item, and information concerning the rights purchased during the transaction. With regard to the rights purchased, in an example, the rights can include a maximum amount of authorized downloads, such as 5, and/or a maximum time limit during which the content can be downloaded (e.g., 24 hours from purchase), and so on.

URL generator 155 creates a bit string using an encryption process involving at least a subset of the transaction information provided by transaction processor 160. URL generator 155 also can use one or more bits of random data as input to the encryption process, to help seed the encryption process and increase the strength of the encryption process. The encryption process preferably is a symmetric key encryption process such as AES, or 3DES. However, asymmetric encryption also can be used, such that a public key can be used to encrypt and a private key to decrypt, for example. In other situations, multiple layers of encryption can be used.

The URL generator 155 then returns a URL containing the encrypted bit string (i.e., the bit string created during the encryption process using the transaction data). In one example, the URL is returned to transaction processor 160, which then provides the URL through the web interface 145, through electronic network 140, to the end user device (e.g., end user device 105*a*) from which the transaction was occurring.

In one example, web server 145 can provide renderable markup language identifying the URL as a mechanism from which the purchased content can be accessed to the end user device 140*a*, which can render the page for the user. In another example, transaction processor 160 can produce an electronic message, such as an e-mail or SMS, that can be sent via an SMTP server, or the like.

Transaction processor 160 also records details concerning the transaction in an entitlement database 165. Initially, such details can simply be to create a record for the transaction, with the transaction identifier. Other details can include linking a user identifier to the record, as well as creating fields such as a number of downloads that have occurred, or a number of downloads allowed. Still further information can be associated with a given validation attempt, such as an IP address associated with the device that provided the URL for authentication, and session information for web site interaction by the user relating to the transaction.

To obtain the content, the user at user device 105*a* can activate the link, such as by clicking on it. The link is then resolved using domain name server technology, such as that provided by an ISP for the end user device 105*a*. The resolved URL (or at least the protocol/domain/host portion of it) then identifies a URL parser 170 that can exist within a different physical system or different network. URL parser 170 obtains the encrypted portion of the URL, provides it to a decryptor 175 that has the appropriate keys to effect the decryption (reversal of whatever encryption was performed by URL generator 155). In some implementations, transaction processor 160 can initiate activation of the link on behalf of the user, such that download or an appropriate type of access initiates without further action on the part of the user. These implementations can be provided in the context of an application that supports automatic installation of content for which download has been completed. Still further, the link can be activated by an application on behalf of the user. As such, these examples do not imply any requirement that a user must personally activate the URL.

Decryptor 175 can include a processor, such as a general purpose processor programmed with data structures and instructions for effecting the decryption. The resulting information from the now-decrypted portion of the URL, which includes the transaction identifying information, and preferably rights identifying information, such as a maximum number of allowed downloads is then made available to a processor for entitlement validation 180. The entitlement validation processor can execute a lookup in entitlement database 165 using the transaction identifying information, to obtain a number of downloads already performed with that transaction identifier. Validator 180 then compares the remaining number of downloads with the maximum number of downloads provided in the now-decrypted portion of the URL. Validator 180 can comprise data structures stored on a memory and instructions for configuring a processor to execute the validation algorithm.

Validator 180 also is configured to communicate with a content delivery process or a redirector process, that respectively either initiates content delivery or performs a redirect to a location at which the content can be obtained. The content delivery process option can be appropriate where the entity 145 controlling the transaction processing also controls or otherwise provides the actual storage of content for delivery (represented in FIG. 1 by content storage 190). A redirect message or response is appropriate for an embodiment where a content delivery network provides hosting for the content, such that the content does not reside on a server controlled by entity 145.

Content storage 190 can comprise one or more servers that can be located in geographically dispersed places in network 140, and which can be linked together by virtual private networks, or even open networks, depending on the desired level of security. A variety of algorithms can be provided to determine on what physical servers in content storage 190 a given item of content should be stored, and whether such content would be provided on a "push" basis to such servers, or responsive to a need for more localized caching, and so on.

Thus, FIG. 1 illustrates an example context wherein a plurality of physical processing resources, such as processors, are configured with data structures and computer executable instructions to execute the functions attributed to them and to interoperate and intercommunicate over physical communication channels, such as electronic networks, including wide and local area networks, and/or other communication techniques such as shared memory access, and the like. These configured processors, communication networks, and computer code according to the algorithms described each provide a respective means for executing the particular functions described with respect to the processes depicted in the flow charts and described herein. Further explanation concerning such functions and their implementation is provided with respect to FIG. 2.

FIG. 2 illustrates steps of an example method 200 of granting entitlements and validating such entitlements, and which can be implemented on systems and arrangements according to FIG. 1 above. Method 200 includes one or more steps involving a user transacting 205 for entitlement to digital content. Such steps can include the steps of identifying an item of content for which rights are to be purchased, providing a means of payment, such as a credit card, or trusted third party payment system identification information, and the like. Responsive to the completed transaction for the desired entitlement (e.g., download access to an identified media object), evidence of the entitlement is recorded 206 in a database. Upon a received (step 210) request to authorize an exercise of the entitlement (by the user, an application associated with the user device, or responsive to transaction completion), an encrypted string is produced 215 that is unique to that transaction.

The encrypted string is produced by using one or more of a symmetric and an asymmetric encryption algorithm on data at least comprising a unique transaction identifier. In some situations, one or more bits of random data can be used in the encryption process, increasing further the likelihood that the resulting encrypted string will be less likely to have a collision with that of another identifier, for example. Other examples of information used in this step can include an identifier for the item, the nature of the entitlement purchased, and a time stamp when the transaction occurred.

The now-encrypted information is used in producing a URL that will be provided to the user who purchased the content entitlement. Method 200 also may comprise establishing 220 a mapping between the item and the URL. For example, if the item were not identified explicitly in the encrypted information in the URL (e.g., by a content identifier), then the transaction identifier may be explicitly linked to the item in a record in database 165.

In step 225, the URL is provided to the user, thereby authorizing the user to exercise the purchased entitlement. Subsequently, method 200 includes receiving 230 a request for exercising the entitlement, evidenced by reception of the URL previously provided to the user. The received URL can be resolved, for example, to identify a particular script that will parse 235 the URL to identify the encrypted portion of the URL and provide it to a decryption process (see FIG. 1)) that will decrypt 240 the encrypted portion. The now-decrypted transaction information is then obtained 245 and used in a comparison 250 with information obtained from an entitlement database (see e.g. FIG. 1).

If a result of the comparison (e.g., decision 260) indicates that the action requested remains within the entitlement provided (e.g., there are downloads remaining), then content provision can be initiated 265 and the entitlement database can be updated 270. Method 200 can then be considered complete in this example.

If the requested action exceeds the entitlement, or if the validation failed for another reason (e.g., the URL was deemed expired, based on a time stamp comparison) then an error message can be returned 275. An error message can include information concerning why the entitlement failed, and could include contact information for a user to resolve what is thought to be an erroneous denial. If there was an entitlement denial because the entitlement has been exhausted, the user can be provided an opportunity to purchase a further entitlement. If denial was because of an expired URL, then that situation can be indicated in the message.

In the example presented in FIG. 2, the user can login into an account or otherwise gain access 280 to a control function relating to transacted-for entitlements. From the control function, the user can request generation of another URL, as evidenced by return to step 210 (i.e., the user can obtain another authorization for the same entitlement). This URL will be generated according to the description above, and preferably has a time stamp indicating when it was generated. This URL can then be used in a request to validate, and exercise the entitlement.

Other aspects that can factor into validating 265 the entitlement and updating 270 the database can include using a particular range of bytes or a start byte identified in the browser request containing the URL. For example, for large files or interrupted transfers, only a middle portion of a file can be requested. In that case, the validation and updating may not count that request towards fulfillment of the purchased entitlement. Instead, only requests for a beginning of a file may be counted, if desired. This allows parallel HTTP downloads for different sections of a file to occur as well, without disrupting the entitlement and validation.

Such byte range considerations can be considered prior to URL time stamp information, in that a middle byte range request may be allowed to proceed with an otherwise expired URL. Alternatively, the validation can be denied if any condition fails.

As described above, time information and comparisons also can be used in validation, and can be included in the encrypted string. For example, a time stamp when a transaction occurred can be included in the encrypted portion, and used to determine whether a request is timely. For example, a limit of 24 hours from purchase (i.e., from initial entitlement) can be enforced. By further example, a time limit can be placed on validity of each and every URL generated. Such limits can be expressed by encoding a maximum time in the encrypted portion, such as a number of seconds, minutes, milliseconds, and so on, after a transaction time or URL generation time. The transaction time can be retrieved from database 165 or obtained from the encrypted portion (after decryption, as explained above and below).

The method 200 of FIG. 2 is generic to a variety of physical examples, which can include examples where a Content Delivery Network (CDN) hosts the content for which entitlement is purchased. Such hosting can be provided on a plurality of geographically dispersed servers, allowing more responsiveness due to lower latency and other beneficial characteristics. However, it also is desirable in the situation of a CDN, to maintain as secret the key or keys used in the encryption and decryption process, such that employees of the CDN cannot grant entitlements to content or use entitlements granted to others.

FIGS. 3A-3D shows an example wherein the usage of an encrypted URL portion for entitlement validation (shown more generically in FIGS. 1 and 2) can be implemented in a situation where content is hosted in a CDN. FIG. 3A illustrates that a user 305, such as located at a user device 305, can exchange payment 306 for a URL evidencing entitlement 307. The URL 307 evidences such entitlement by containing an encrypted portion according to the above description. The payment can be exchanged with a content seller network 310. For example, the web serving interface 145, transaction processor 160, URL generator 155 and so on can be contained within content seller network 310. In one example, a URL generated can be of the form shown in Table 1, below.

TABLE 1 http://[authority]/[authentication path]/[format]/[store front ID]/[encrypted string]/[token delimiter]/[logical path to object]

The scheme shown in the URL of Table 1 is "http". The [authority] portion of example URL can include, for example, downloads.example.com, which can, in the case of using a CDN 315, resolve to a server or group of servers at the CDN.

This resolution aspect is shown more particularly in FIG. 3B, in that a Domain Name Service (DNS) 320 can resolve the authority in authorization URL 307 to an IP address (for example) associated with the CDN 315 (here, the term "authorization" is used to identify the URL with the encrypted portion to distinguish between another URL described below). In turn, CDN 315 can try to obtain access (316) to content using the remaining portion of the URL, upon its communication from user 305 to CDN 315.

In FIG. 3C, the usage by the CDN 315 of the authentication URL 307 then causes the presentation of the authorization URL 307 to a server at the content seller network 310 (e.g., a server can be identified according to the format, and store identifier portions of the URL in Table 1). As shown in more detail in FIG. 3D, parsing 330 of authorization URL 307 can be provided, decryption 331 of the encrypted string can then occur, and validation 332 of the authorization URL 307 and of a remaining entitlement to download content can occur. As explained above, validation preferably comprises validation both of the particular authorization URL 307 received (i.e., such validation occurs by determining whether it was used within a time limit, for example), and also that even if used within a valid timeframe, the entitlement to which the authorization URL 307 relates has not been expended. In implementations, a server can represent a group of load balanced servers, for example, and does not imply a single physical entity.

Upon a successful validation (Y in validation 332), a redirect URL 340 is generated and provided to CDN 315, which can then obtain the actual content from that location. Redirect URL 340 can be a private URL that is resolved to a server or storage location accessible within CDN 315, and is not a publicly accessible address. Then, content 345 obtained by using the redirect URL 340 is sent to user 305. In this fashion, a location from which the content can be accessed directly is not exposed to the public, such as through the public Internet, and the validation of entitlement can occur within servers owned by the content seller network 310.

In a typical usage scenario, many distinct users (e.g., hundreds of thousands or millions of users) may transact to purchase access to one or more items of content. Many such transactions will be for the same item of content. According to these disclosures, each transaction for the same item of content is identified with a separate transaction identifier, which in turn is used to product an encrypted URL portion (which also can contain other information, as described above). Also, each transaction by the same users will have a unique encrypted URL portion for each transaction. Further, each authentication URL also will be unique, both among other such URLs for other transactions and for all such URLs for the same transaction. By providing this encrypted URL method of validating an entitlement, a user does not have to log into an account with a user name and password for example, or some other equivalent means to authenticate his identity.

In some examples, the prior usage information, used to validate each entitlement request, can be stored in the content seller network. However, in other examples, that information also can be stored in the encrypted URL portion. In the latter case, after the encrypted portion has been decrypted, the prior usage information obtained from the decrypted portion can be stored, at least temporarily, on a computer readable medium, such as a RAM, or a hard disk and used in the validation comparison. Therefore, the reading of a computer readable medium for such prior usage information is generic to either implementation. Other information can be stored in the encrypted URL portion as deemed necessary or desirable to implement other types of entitlements.

The exemplary ordering of steps in any flow chart depicted does not imply that steps necessarily be completed in that order. Any of intermediate values, or final values, or other data described as being generated or produced can be saved to a computer readable medium, either temporarily, such as in a RAM, or more permanently, such as in non-volatile storage.

Figure 4:
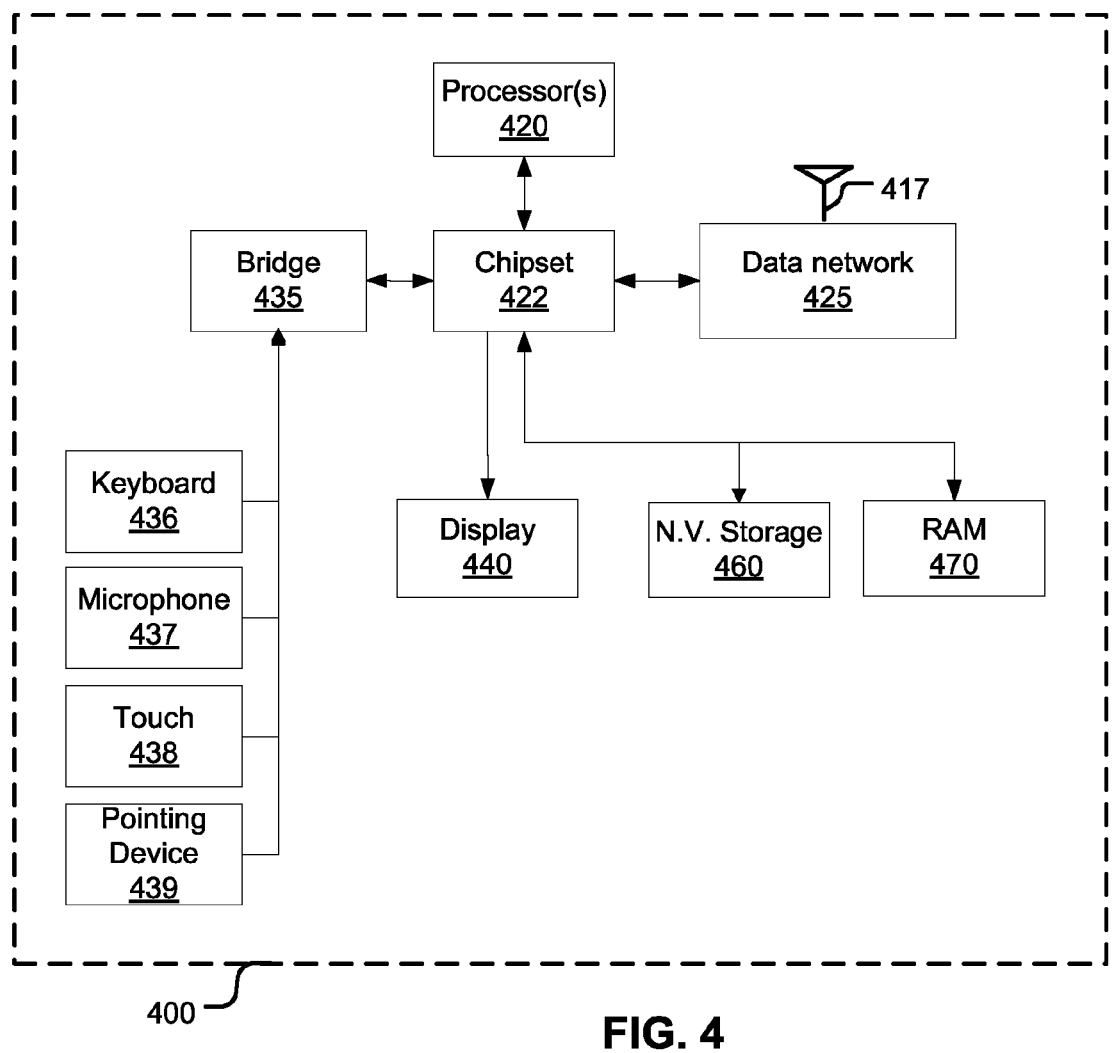
FIG. 4 illustrates example components of a system that can be used in implementing portions of the arrangement in FIG. 1.

FIG. 4 illustrates a computer system 400, in communication with a second computer system 475. Computer system 400 is an example of computer hardware, software, and firmware that can be used to implement disclosures below. System 400 includes a processor 420, representative of any number of physically and/or logically distinct resources capable of executing software, firmware, and hardware configured to perform identified computations. Processor 420 communicates with a chipset 422 that can control input to and output from processor 420. In this example, chipset 422 outputs information to display 440, and can read and write information to non-volatile storage 460, which can include magnetic media, and solid state media, for example. Chipset 422 also can read data from and write data to RAM 470. A bridge 435 for interfacing with a variety of user interface components can be provided for interfacing with chipset 422. Such user interface components can include a keyboard 436, a microphone 437, touch detection and processing circuitry 438, a pointing device, such as a mouse 439, and so on. In general, inputs to system 400 can come from any of a variety of sources, machine generated and/or human generated.

Chipset 422 also can interface with one or more data network interfaces 425, that can have different physical interfaces 417. Such data network interfaces can include interfaces for wired and wireless local area networks, for broadband wireless networks, as well as personal area networks.

Methods according to the above-described examples can be implemented using computer-executable instructions that are stored or otherwise available from computer readable media. When stored on a computer readable media, these instructions are physically embodied on the media as data structures. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and software for configuring such hardware, and can take any of a variety of form factors. Typical examples of such form factors include rack-mountable servers, appliances, laptops, small form factor personal computers, personal, and so on. Some functionality described herein, and more particularly, the encryption/decryption functionality can be embodied in peripherals or add-in cards, or other special purpose designs. Such functionality also can be implemented on a circuit board among different chips or different processes executing in a single device, by way of further example. As such, description of implementing steps of a method on a processor includes implementing such steps on a plurality of processors, and/or on different logical or physically distinct portions of a processor. For example, steps of a method can be implemented on a group of servers, each server can comprise multiple processors, each with multiple cores, and unless understood otherwise from the context, a processor can refer to any one or more such processing resources implementing the function.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A method comprising:
performing a transaction between a user and a transaction system for purchase of user-specific rights to digital content delivered electronically;
storing a record of the transaction, wherein the record is accessible by the transaction system, and wherein the record entitles the user to exercise the user-specific rights to the digital content;
providing to a user device a resource address for accessing the digital content based on an authorization to exercise the user-specific rights, wherein the resource address comprises an encrypted string that represents, upon decryption, unique transaction identifier information and rights information associated with the user-specific rights, wherein the rights information specifies a maximum number of authorized downloads available to the user; and
providing access to the digital content identified by the resource address, based on the rights information, the unique transaction identifier, and the record of the transaction, in response to a successful validation of a user request to exercise the user-specific rights.

2. The method of claim 1, further comprising accessing the record using the unique transaction identifier information to obtain information indicative of prior consumption of the user-specific rights, and comparing the information with the user-specific rights in the validation of a user request to exercise the user-specific rights.

3. The method of claim 1, wherein the digital content is stored in a Content Delivery Network (CDN) that is independent from the transaction system.

4. The method of claim 1, further comprising:
accepting the user request from the user at the CDN;
forwarding the encrypted string to a system controlled by an operator of the transaction system for validation;
and providing a private resource address for accessing digital content.

5. The method of claim 1, wherein the resource address is made accessible to the user by at least one of an electronic message and a web page, in response to completion of the transaction, wherein the resource address is a uniform resource locator.

6. The method of claim 1, wherein the transaction identifier information comprises a purchase completion time stamp indicating the time the transaction completed.

7. The method of claim 6, wherein the purchase completion time stamp is utilized during the validation to determine whether the purchase occurred within a time limit.

8. The method of claim 1, wherein the transaction identifier information comprises a resource address generation time stamp indicating the time the resource address was generated, wherein the resource address is a uniform resource locator.

9. The method of claim 8, wherein the resource address generation time stamp is utilized during the validation to determine whether the request to exercise the user-specific rights is made during a valid timeframe.

10. The method of claim 1, wherein the record and the maximum number of authorized downloads are utilized during the validation to determine whether the maximum number of authorized downloads has been reached, wherein the record includes information indicative of a number of prior downloads initiated using the resource address.

11. The method of claim 1, wherein the encrypted string is based on at least one bit of random data, the unique transaction identifier information and rights information.

12. The method of claim 1, wherein the transaction identifier information contains time limit information, wherein the time limit information is utilized during the validation to determine whether the request was made within a specific time allocation.

13. The method of claim 12, wherein a user can purchase additional time to extend the time allocation.

14. The method of claim 1, wherein the digital content comprises at least one of text, image, audio and video.

15. The method of claim 1, wherein a control function configured to generate additional user-specific rights to the digital content is accessible to the user when the user request is received after the maximum number of authorized downloads has been reached.

16. The method of claim 1, wherein the resource address for accessing the digital content includes a start byte representing a download resumption point.

17. The method of claim 16, wherein information indicative of a number of prior downloads initiated using the resource address is unchanged when the start byte is identified in the resource address.

18. A non-transitory computer-readable storage medium storing instructions which, when executed by a computing device, cause the computing device to perform steps comprising:
performing a transaction between a user and a transaction system for purchase of user-specific rights to digital content delivered electronically;
storing a record of the transaction, wherein the record is accessible by the transaction system, and wherein the record entitles the user to exercise the user-specific rights to the digital content;
providing to a user device a resource address for accessing the digital content based on an authorization to exercise the user-specific rights, wherein the resource address comprises an encrypted string that represents, upon decryption, unique transaction identifier information and rights information associated with the user-specific rights, wherein the rights information specifies a maximum number of authorized downloads available to the user; and
providing access to the digital content identified by the resource address, based on the rights information, the unique transaction identifier, and the record of the transaction, in response to a successful validation of a user request to exercise the user-specific rights.

19. The non-transitory computer-readable storage medium of claim 18, wherein the resource address is a uniform resource locator.

20. The non-transitory computer-readable storage medium of claim 18, wherein the user-specific rights comprise entitlement to download digital content.

21. A system comprising:
a processor;
a memory storing instructions for controlling the processor to perform steps comprising:
performing a transaction between a user and a transaction system for purchase of user-specific rights to digital content delivered electronically;
storing a record of the transaction, wherein the record is accessible by the transaction system, and wherein the record entitles the user to exercise the user-specific rights to the digital content;

providing to a user device a resource address for accessing the digital content based on an authorization to exercise the user-specific rights, wherein the resource address comprises an encrypted string that represents, upon decryption, unique transaction identifier information and rights information associated with the user-specific rights, wherein the rights information specifies a maximum number of authorized downloads available to the user; and providing access to the digital content identified by the resource address in response to a successful validation of a user request to exercise the user-specific rights based on the rights information, the unique transaction identifier, and the record of the transaction.

22. The system of claim 21, wherein the resource address is a uniform resource locator.

\* \* \* \* \*